United States Patent
Orton

[11] 3,943,510
[45] Mar. 9, 1976

[54] PULSE-REPETITION FREQUENCY DISCRIMINATOR (PRFD) FOR TRACKING RADAR SIGNALS

[75] Inventor: Criley Orton, Arlington, Calif.

[73] Assignee: The United States of America as represented by the Secretary of the Navy, Washington, D.C.

[22] Filed: Oct. 2, 1964

[21] Appl. No.: 401,767

[52] U.S. Cl............ 343/7 A; 307/233 R; 343/18 E
[51] Int. Cl.² .......................................... G01S 7/28
[58] Field of Search...... 343/7 A, 7.3, 17.1 R, 18 E; 307/233

[56] References Cited
UNITED STATES PATENTS
3,013,260  12/1961  Schwalbe ............................ 343/7.3
3,758,856  9/1973   Fromm .......................... 343/18 E X

*Primary Examiner*—Tubbesing
*Attorney, Agent, or Firm*—Richard S. Sciascia; J. M. St. Amand; T. M. Phillips

EXEMPLARY CLAIM

1. In a pulse-repetition frequency discriminator, the combination comprising:

a. a pulse generator for generating pulses at a predetermined reference frequency,
b. a gate generator coupled to said pulse generator and being responsive to the generated pulses to generate a gate signal having a width of a predetermined percentage of the repetition period of the predetermined reference frequency,
c. ramp generator means coupled to said gate generator for converting said gate signal into a triangular shaped signal,
d. a normally closed gate circuit coupled to said ramp generator means and to an input terminal adapted to receive radar pulses of interest and being responsive to received radar pulses having a frequency within said gate signal to pass a portion of said triangular shaped signal,
e. circuit means having an input coupled to said normally closed gate circuit and having a reference voltage equal to one-half the amplitude voltage of said triangular shaped signal and having an output coupled to said pulse generator for feeding a corrective voltage proportional to the difference between the amplitude of the output voltage passed by said normally closed gate and said reference voltage to said pulse generator to change the PRF of said pulse generator in a direction to reduce said corrective voltage to zero.

5 Claims, 3 Drawing Figures

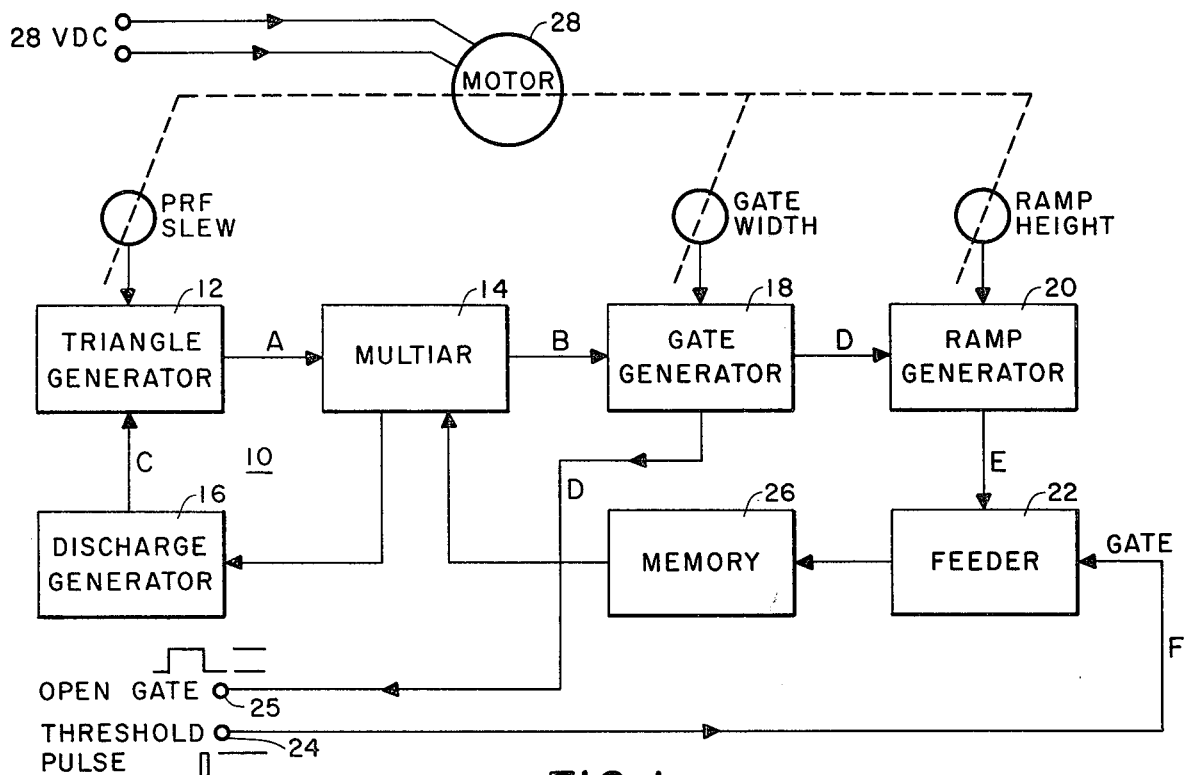
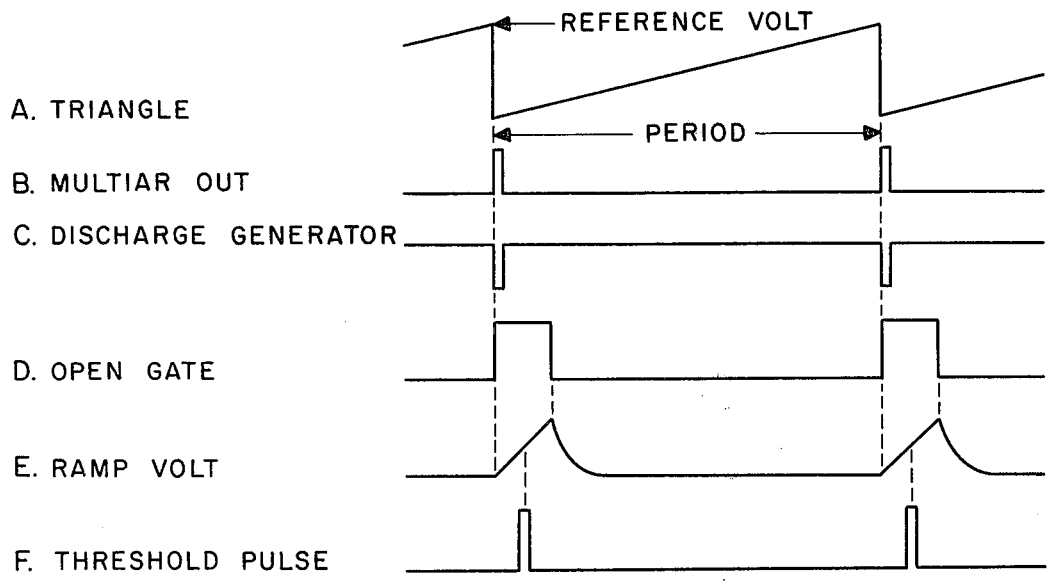
FIG. 3

CRILEY ORTON
INVENTOR.

BY

ATTORNEYS

PULSE-REPETITION FREQUENCY DISCRIMINATOR (PRFD) FOR TRACKING RADAR SIGNALS

The invention herein described may be manufactured and used by or for the Government of the United States of America for governmental purposes without the payment of any royalties thereon or therefor.

The present invention relates to pulse repetition frequency discriminators (PRFD) and more particularly to pulse repetition frequency discriminators for tracking radar signals.

There are several pulse repetition frequency (PRF) discriminators available for use in target acquisition systems, but they have the disadvantage of either operating only over a narrow PRF range or cover a suitable range but are large and complex. The present invention provides a PRFD which is stable over a wide range of operating frequencies and temperatures and yet is simple in construction and requires a small volume.

The present invention provides a system which can acquire and track the pulses from a target radar and reject pulses produced by any other source. The pulse repetition frequency of the target radar is detected and then locked on by the detector. A PRF gate is generated and its time position is controlled so that the radar pulse appears in the middle of the gate. A comparison circuit provides a feedback to initiate control of the gate position so that the radar pulse will appear within the gate.

An object of the present invention is the provision of a pulse repetition frequency discriminator which will acquire one train of radar pulses to the exclusion of pulses produced by extraneous radars.

Another object of the invention is the provision of a pulse repetition frequency discriminator with a wide pulse repetition frequency range of operation and is stable over a wide temperature range.

Other objects and many of the attendant advantages of this invention will become readily appreciated as the same becomes better understood by reference to the following detailed description when considered in connection with the accompanying drawings wherein:

FIG. 1 is a block diagram of a preferred embodiment of the invention.

FIG. 3 is a graph of representative waveforms used in describing the embodiment of FIG. 1.

Figure 2:
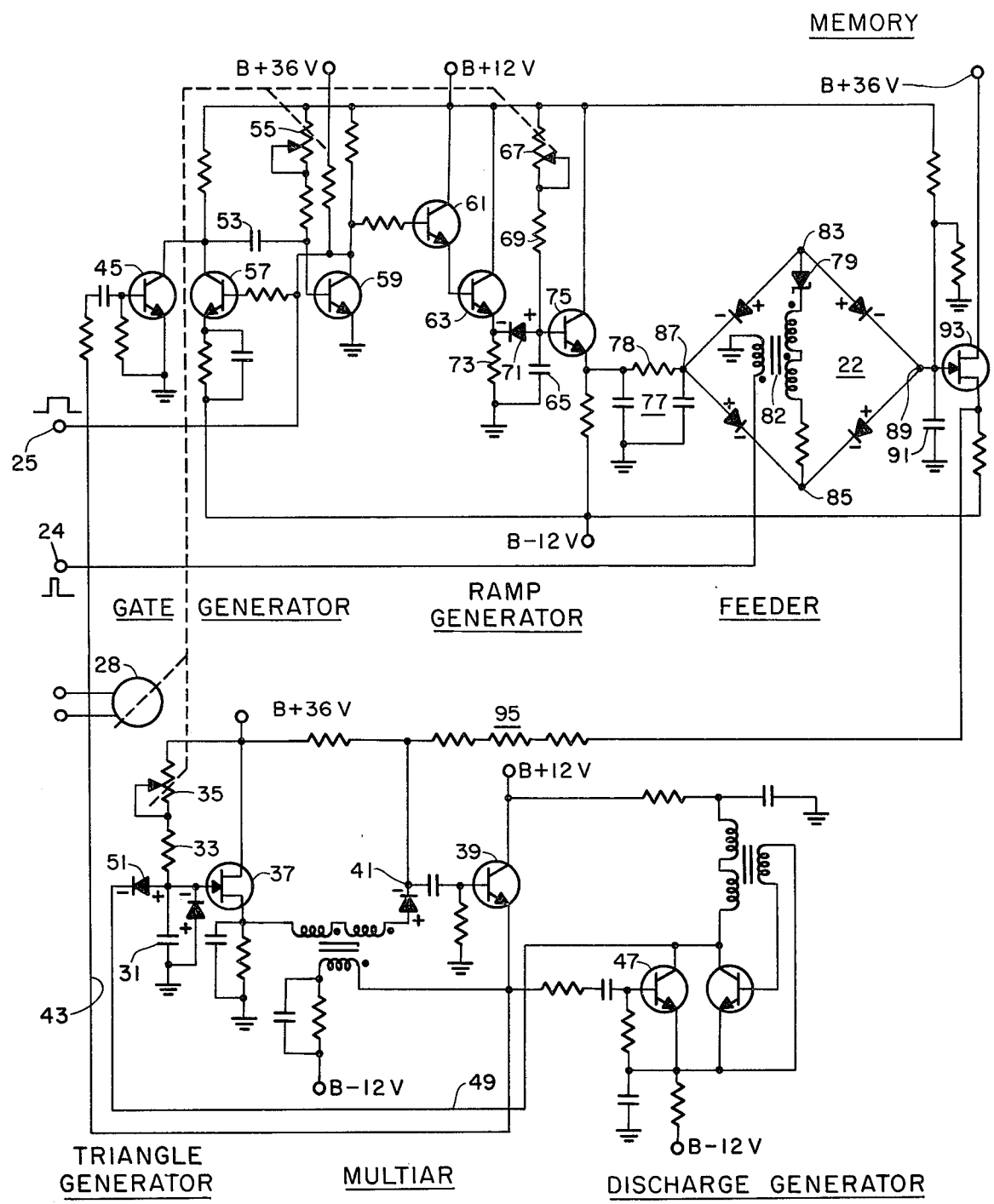
FIG. 2 is a schematic diagram of the embodiment of FIG. 1.

Referring now to the drawings there is shown in FIG. 1 a pulse repetition frequency generator 10 consisting of triangle generator 12, multiar 14 and discharge generator 16. Gate generator 18 which is initiated by an output pulse from multiar 14 determines the width of the open gate provided for the video circuitry. The output from gate generator 18 is integrated in ramp generator 20 and provides a linear triangle voltage which is fed to feeder circuit 22. A gate pulse arriving at terminal 24 during the duration of the triangle voltage pulse from ramp generator 20 will gate some of the ramp voltage to memory circuit 26. If the gate pulse arrives early or late during the duration of the triangle pulse a voltage will be fed to the memory circuit 26 and then to multiar 14 to either increase or decrease the PRF of generator 10 so that the gate pulse will appear in the middle of the triangle pulse. Multiar 14 operates in the same manner as the standard multiar except the polarity of the input waveform is reversed from the normal.

The frequency of triangle generator 12, gate width of the output of gate generator 18, and the ramp height of the output of ramp generator 20 are controlled by drive motor 28 which is connected to a manual control means, not shown.

As shown in FIG. 2, triangle generator 12 has a variable RF circuit comprising capacitor 31, and resistors 33, 35. The rate at which capacitor 31 charges is controlled by motor driven potentiometer 35, which is the PRF slew. The triangle generated voltage (waveform A, FIG. 3) is coupled by field-effect transistor 37 which functions in the same manner as a cathode follower, to the voltage comparing transistor 39 in multiar 14. A reference voltage averaging about +10 volts is provided at junction 41. When the amplitude of the output waveform from generator 12 is equal to the reference voltage at terminal 41, multiar 14 is triggered and generates a narrow pulse (waveform B, FIG. 3). This pulse is coupled by lead 43 to transistor 45 of gate generator 18 and to transistor 47 of discharge generator 16. Discharge generator 16 is shown as a blocking oscillator which produces a narrow negative pulse (waveform C) which is fed back through lead 49 and diode 51 to field-effect transistor 37 to drive triangle generator 12 to ground and the cycle will begin again. There will be approximately ten microseconds jitter at 200 PPS and essentially no jitter at 2,000 PPS.

Gate generator 18 determines the width of the open gate (waveform D and the signal at terminal 25). A desired width is ten percent of the PRF period and is determined by the value of capacitor 53. To maintain a constant percentage of gate width regardless of PRF, the period of gate generator 18 is varied by varying potentiometer 55 in synchronism with potentiometer 35. When a pulse is received from multiar 14, transistor 45 triggers the one-shot multivibrator comprised of transistors 57 and 59.

The output signal (waveform D) is coupled to output terminal 25 and to ramp generator 20 where it is integrated to provide a linear triangle voltage (waveform E). The positive-going gate voltage at transistor 59 is coupled to the double emitter follower, transistors 61 and 63, pulling the emitter of transistor 63 to almost B+ voltage of approximately 10 volts. Capacitor 65 begins charging positively through potentiometer 67 and resistor 69. The time constant of the charging circuit is adjusted by motor-driven potentiometer 67 and should be adjusted to produce a constant +7 volt amplitude at the time the gate pulse terminates. When the gate is removed, the positive voltage on capacitor 65 is discharged through diode 71 and emitter resistor 73 to ground. The generated ramp voltage is coupled through emitter follower 75 and filter network 77 to one side of feeder network 22.

Feeder circuit 22 is a ring diode gate and current passage through the ring is normally prevented by zener diode 79. A pulse received at terminal 24 and coupled through transformer 82 breaks down diode 79 so that a low impedance exists across terminals 83 and 85 of the ring diode gate. The ramp voltage from emitter follower 75 is applied to terminal 87 of the feeder network 22 and terminal 89 has a voltage applied that is half way between the minimum and maximum values of the ramp voltage. Memory capacitor 91 is isolated from the ramp voltage by the feeder network except when the threshold pulse at terminal 24, denoting a video pulse to be tracked, is applied. If the threshold pulse is applied during the last half of the gate (waveform D), the ramp voltage is positive with respect to the nominal memory capacitor voltage at terminal 89, and a positive charge is fed to capacitor 91. If the pulse occurred during the first half of the gate, a negative charge is added. The amount of charge added is linearly proportional to the distance from the center of the gate, being zero at the center of the gate and a maximum at the edges. The rate of charge, or gain of the tracking loop, can be adjusted by changing the value of resistor 78.

The voltage developed across capacitor 91 is coupled through field-effect transistor 93 which functions in the same manner as a cathode follower, to temperature compensated resistance network 95, which results in a PRF tracking perturbation around the nominal multiar reference voltage. There will be a variation of slightly above and below the multiar reference voltage, depending upon the amount of PRF generator correction that is required to maintain lock upoon a signal. The change of voltage across memory capacitor 91 is applied to transistor 39 of multiar 14, causing the period of PRF generator 10 to increase or decrease, depending on the direction of the change.

Obviously many modifications and variations of the present invention are possible in the light of the above teachings. It is therefore to be understood that within the scope of the appended claims the invention may be practiced otherwise than as specifically described.

What is claimed is:

1. In a pulse-repetition frequency discriminator, the combination comprising:
   a. a pulse generator for generating pulses at a predetermined reference frequency,
   b. a gate generator coupled to said pulse generator and being responsive to the generated pulses to generate a gate signal having a width of a predetermined percentage of the repetition period of the predetermined reference frequency,
   c. ramp generator means coupled to said gate generator for converting said gate signal into a triangular shaped signal,
   d. a normally closed gate circuit coupled to said ramp generator means and to an input terminal adapted to receive radar pulses of interest and being responsive to received radar pulses having a frequency within said gate signal to pass a portion of said triangular shaped signal,
   e. circuit means having an input coupled to said normally closed gate circuit and having a reference voltage equal to one-half the amplitude voltage of said triangular shaped signal and having an output coupled to said pulse generator for feeding a corrective voltage proportional to the difference between the amplitude of the output voltage passed by said normally closed gate and said reference voltage to said pulse generator to change the PRF of said pulse generator in a direction to reduce said corrective voltage to zero.

2. The discriminator of claim 1 wherein said pulse generator comprises:
   a. a triangle generator for generating triangle wave shaped voltages,
   b. a multiar circuit coupled to said triangle generator for generating an output pulse when the amplitude of the triangle voltage reaches a predetermined value,
   c. discharge generator means coupled to said triangle generator and to said multiar circuit and being responsive to the output pulse of said multiar circuit for generating a discharge pulse to terminate the output voltage from said triangle generator and cause a new waveform signal to start.

3. The discriminator of claim 2 wherein said multiar circuit comprises:
   a. a transistor having a collector base and emitter,
   b. input circuit means including a feedback transformer, diode and coupling capacitor connected in series, said coupling capacitor being connected to said base,
   c. a reference voltage connected to a point intermediate said diode and said capacitor, said diode being poled so that an input signal having a magnitude less than said reference voltage is blocked,
   d. circuit means coupling a positive feedback to said feedback transformer.

4. The discriminator of claim 1 wherein said normally closed gate circuit comprises:
   a. a ring type diode bridge,
   b. a Zener diode,
   c. an input transformer having a primary winding and a secondary winding connected in series with said Zener diode between the first and third bridge junctions,
   d. said triangular shaped signal being connected between the second and fourth bridge junctions.

5. The discriminator of claim 1 wherein said circuit means comprises:
   a. a storage capacitor coupled to said gate circuit and to said reference voltage so that when the output from said gate circuit is different from said reference voltage a charge proportional to the difference will flow in said capacitor.

* * * * *